UNITED STATES PATENT OFFICE.

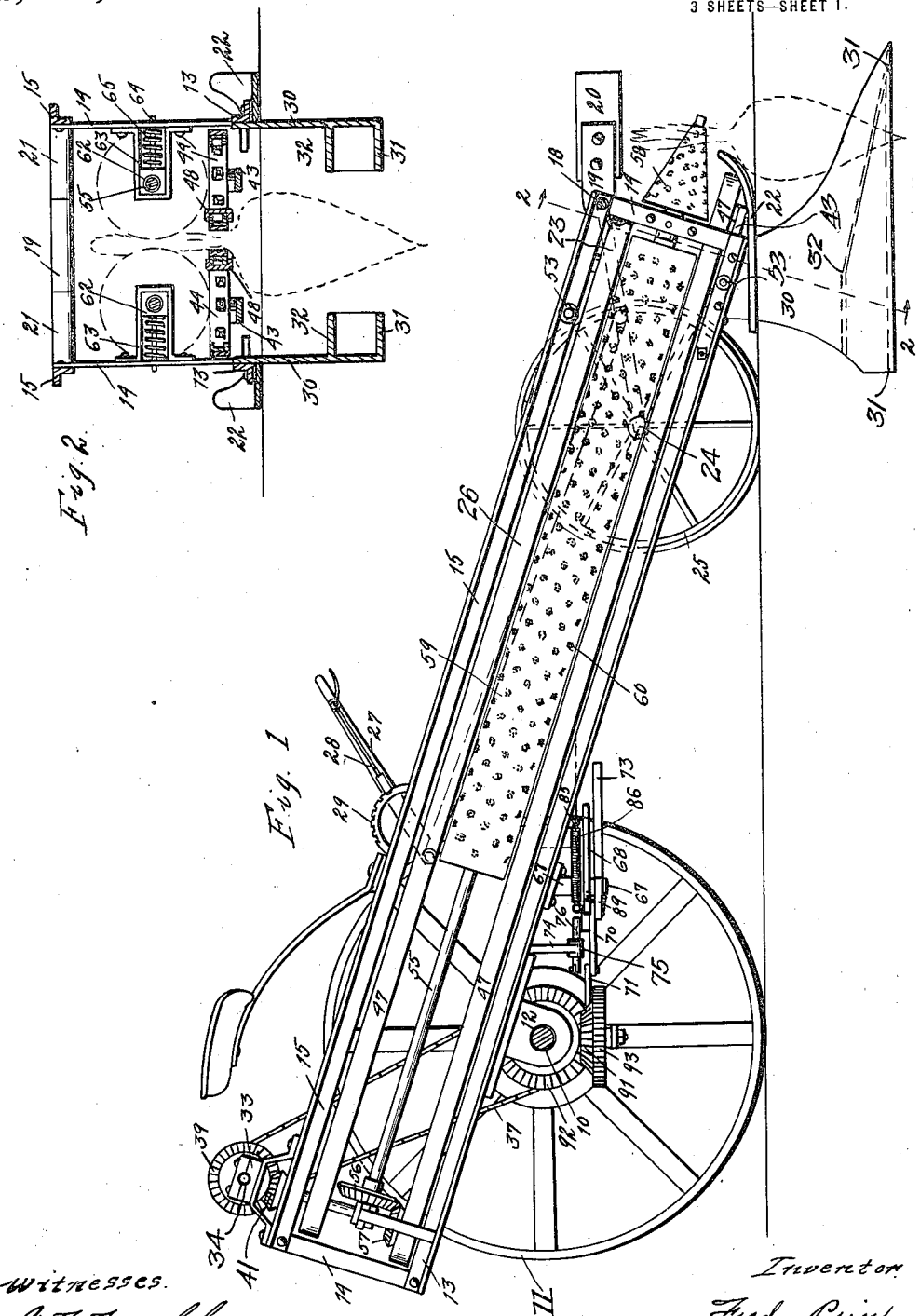

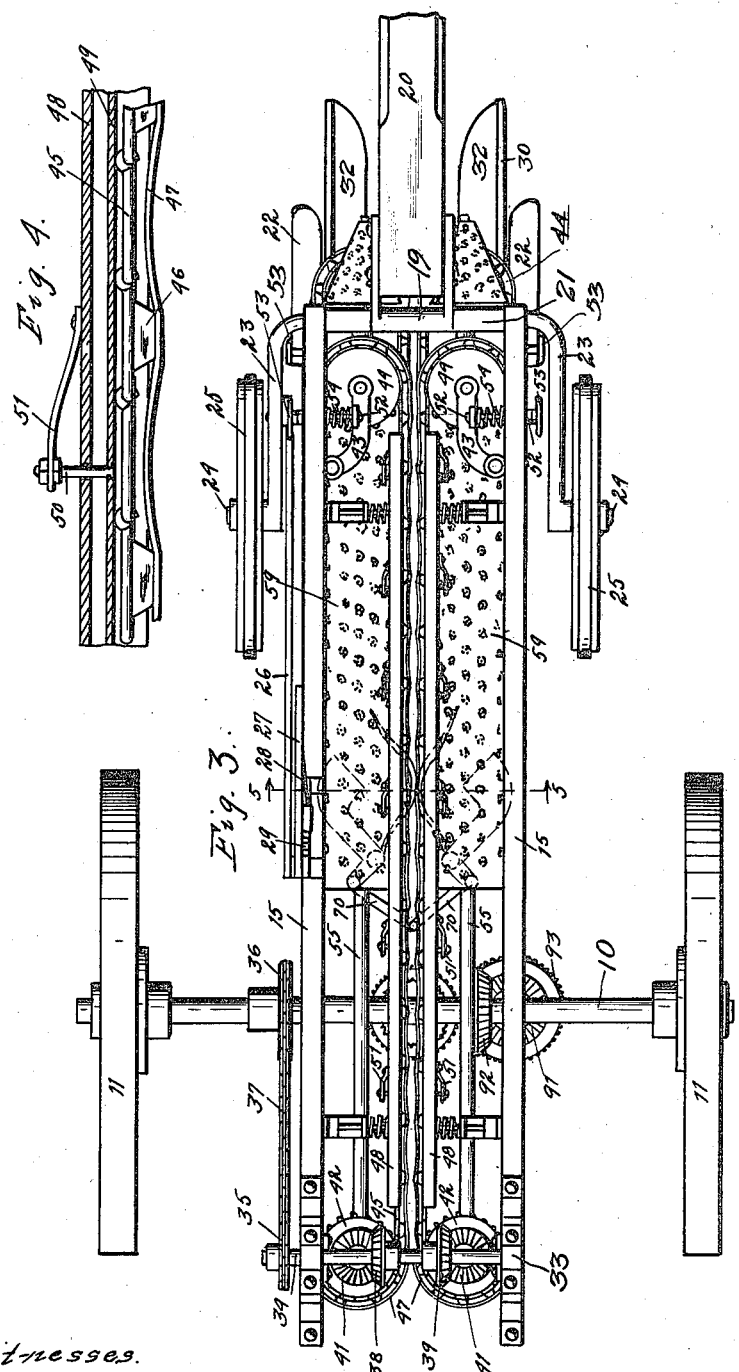

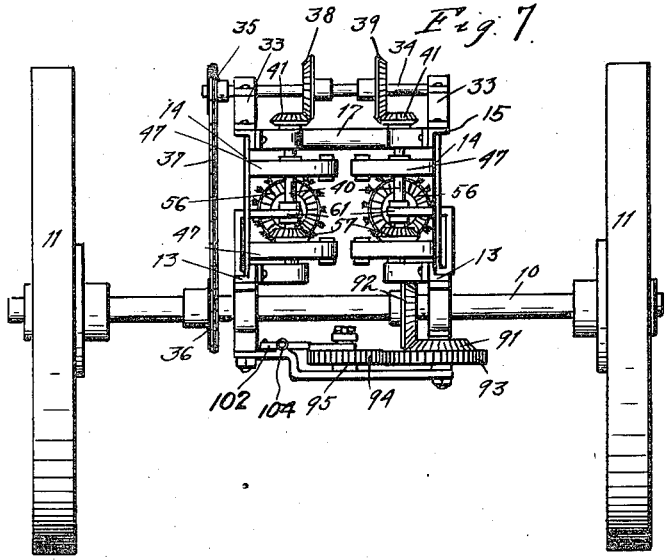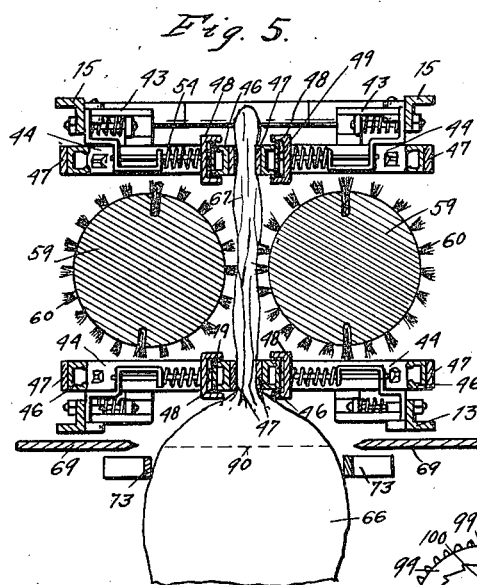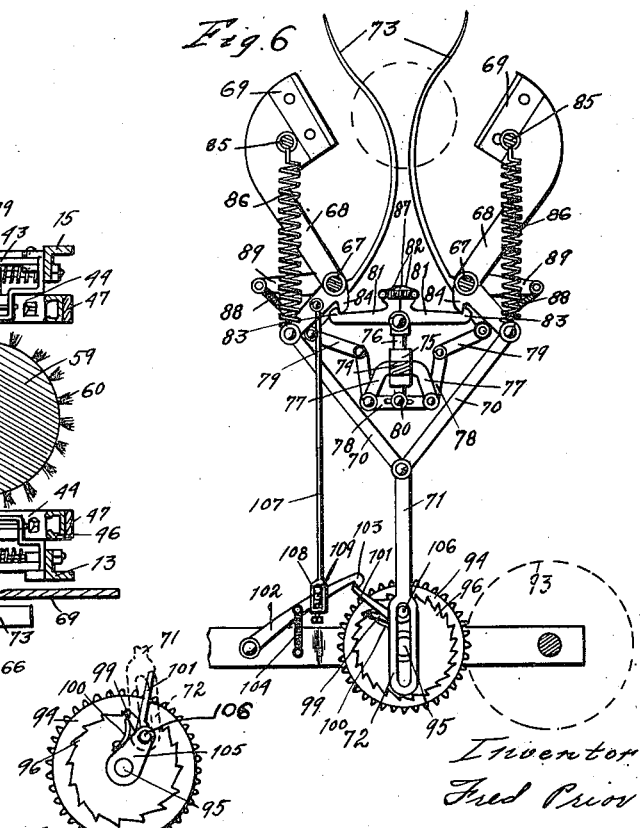

FRED PRIOR, OF DES MOINES, IOWA.

BEET-HARVESTER.

1,301,006.     Specification of Letters Patent.     Patented Apr. 15, 1919.

Application filed June 7, 1915. Serial No. 32,786.

*To all whom it may concern:*

Be it known that I, FRED PRIOR, a citizen of the United States, and resident of Des Moines, in the county of Polk and State of Iowa, have invented a certain new and useful Beet-Harvester, of which the following is a specification.

The object of my invention is to provide a beet harvester adapted to remove beets from the ground and cut the tops therefrom.

A further object is to provide such a harvester having mechanism adapted to grasp the tops of the beets and to carry the beets toward a cutting knife and to position the beets with relation to the knife, so that a certain part of the tops and the upper portion of each beet will be cut off.

A further object is to provide such a device so constructed and arranged as to handle the beets without bruising the beets.

A further object is to provide such a harvester having an adjustable mechanism which will be automatically adjusted for handling beets of different sizes.

A further object is to provide suitable means of new and novel construction for carrying the beets rearwardly in the machine.

Still a further object is to provide suitable means for cutting the tops off the beets and mechanism for operating said cutting means, guide devices for positioning the beets for cutting, and for setting the cutting mechanism in operation at the proper time.

Still a further object is to provide a plow device for raising the beets in position for being seized by the carrying mechanism.

Still a further object is to provide simple means for raising and lowering the free end of the machine and for supporting the front end of the machine when said machine is being hauled over ordinary roads.

My invention consists in the construction, arrangement and combination of the various parts of the device whereby the objects contemplated are attained as hereinafter more fully set forth pointed out in my claims and illustrated in the accompanying drawings, in which:

Figure 1 shows a side elevation of a beet harvester embodying my invention.

Fig. 2 shows a detail sectional view of the same taken on the line 2—2 of Fig. 1.

Fig. 3 shows a top or plan view of my improved beet harvester.

Fig. 4 shows a longitudinal horizontal sectional view of one of the belts and the supporting mechanism therefor.

Fig. 5 shows a vertical sectional view taken on the line 5—5 of Fig. 3.

Fig. 6 shows a top or plan view of the cutting mechanism.

Fig. 7 shows a rear elevation of the machine, and

Fig. 8 shows a detail view of part of the actuating mechanism for the cutting devices.

In the accompanying drawings, I have used the reference numeral 10 to indicate generally the rear axle of the machine on which are fixed the supporting wheels 11. Pivotally mounted on the axle 10 by means of brackets 12 are longitudinal frame members 13, spaced laterally from each other and extending downwardly and forwardly in the machine. At each corner of the frame is a substantially upright member 14. The members 14 at each side of the machine are connected at their upper ends by longitudinal members 15 extending from their rear ends downwardly and forwardly from the machine. The members 15 are connected at their rear ends by a suitable transverse frame member 17, and at their forward ends by an axle or shaft 18. Centrally mounted on the shaft 18 is a bearing 19 to which is secured a tongue 20. On each side of the bearing 19 are spacing sleeves 21.

Suitably supported on the frame, at the sides thereof at the forward end of the machine, are shoes 22, which are adapted to slide on the ground when the forward end of the machine is lowered to a limiting depth of travel of the plow.

On the ends of the axle or shaft 18 are rearward and downward extensions 23, which have at their rear ends outwardly extending axle members 24, on which are mounted the proper wheels 25. Connected with one of the extensions 23 is a rearwardly extending rod or bar 26, which is connected with a suitable lever 27 having a pawl 28 adapted to coact with a sector 29. By the operation of the lever 27 the extensions 23 may be moved toward or from vertical position for raising or lowering the front end of the machine. On account of the pivotal mounting of the bracket 12, it will readily be seen that the machine can be tilted on the axle 10.

Secured to the lower forward portion of the frame are plow members comprising the upright members 30 spaced from each other, as shown in Fig. 2.

At the lower edges of the members 30 are inwardly extending cutting blades 31 arranged to be substantially horizontal when the forward end of the machine is lowered. Above the blades 31 are cutting blades 32 inclined from their forward edges upwardly and rearwardly for the purpose of raising the earth around the beets, as illustrated by the dotted lines in Fig. 1.

Mounted in suitable bearings 33 above the rear end of the frame is a transverse shaft 34 on which is a sprocket wheel 35 in line with a sprocket 36 on the axle 10. A chain 37 travels on the sprockets 35 and 36 for imparting rotation from the axle 10 to the shaft 34. On the shaft 34 are spaced beveled gears 38 and 39. Mounted in suitable bearings at the rear portion of the frame are substantially upright shafts 40 on the upper ends of which are beveled gears 41 in mesh with respective beveled gears 38 and 39, whereby rotation is imparted from the shaft 34 to the shafts 40.

On each shaft 40 are spaced sprocket wheels 42. The respective sprocket wheels 42 on each shaft 40 are opposite the respective sprocket wheels on the other shaft 40.

Pivoted to each side of the machine on the upper and lower portions thereof, at the forward end of the frame, are detachable brackets 43, inclined forwardly and inwardly in the machine, as illustrated in Fig. 3. Rotatably mounted in the forward ends of the brackets 43 are sprocket wheels 44. The respective sprocket wheels 44 on each side of the machine are opposite the respective sprocket wheels 44 on the other side of the machine, as illustrated in Figs. 2 and 3.

Traveling upon the sprocket wheels 42 and 44 are endless belts of peculiar construction. There are four of said belts arranged as illustrated in Figs. 3 and 7. The upper brackets 43 are located rearwardly in the machine with relation to the lower brackets 43, as shown in Fig. 3. The upper brackets 43 are shown in Fig. 3, and the lower brackets are shown partly in section in Fig. 2. The belts which I have indicated by the reference character 45 are of link construction adapted to travel on the sprocket wheels 42 and 44. On some of the links of the chains 45 are laterally extending blocks 46 spaced from each other on the chains 45, as illustrated in Fig. 4. Secured to the blocks 46 are flexible strips 47 of some suitable material such as leather, canvas belting or the like.

Suitably mounted on the frame of the machine are inwardly opening channels 48, in which the belts 45 travel and which prevent the said belts from sagging at points where it is desirable to support the beets in certain positions.

Mounted in each channel 48 is a resilient metal strip or the like 49 preferably of steel. The strips 49 are mounted on bolts 50 slidably extended through the backs of the channels 48 as illustrated in Fig. 4, and secured at their outer ends by springs 51, whereby it is possible for the strips 49 to slide inwardly and outwardly in the channels 48. It will be seen that the flexible strips 47 give some flexibility to the belts, and that further flexibility is given by means of the resilient strips 49 which are preferably comparatively thin.

The channels 48 are arranged as shown in Fig. 3 carrying the adjacent stretches of the belts 45 on opposite sides of the machine. Secured to the pivoted brackets 43 are rods 52 which extend through the frame members as illustrated in Fig. 3. On the outer ends of the rods 52 are screwed heads 53. On the rods 52, between the frame members and the brackets 43, are coil springs 54. It will be seen that by screwing the heads 53 further on or off the rods 52, the forward ends of the brackets 43 and the sprocket wheels carried thereby may be moved laterally in the machine toward or from the vertical plane on the longitudinal axis of the machine.

It will be noted in this connection that the pair of belts 45 on one side of the machine are spaced laterally in the machine from the pair of belts 45 on the other side of the machine, and also that the belts on the same side of the machine are spaced from each other one being considerably above the other.

Arranged between the pair of belts on each side of the machine is a longitudinal shaft 55. The shafts 55 are mounted in suitable bearings at the forward and rear ends of the machine. At the rear ends of the shafts 55 are beveled gears 56 in mesh with beveled gears 57 on the respective shafts 40. The lower ends of the shafts 55 extend forwardly from the machine, as illustrated in Fig. 1, and carry cone-shaped rollers or drums 58. On the lower portions of the shafts 55 are rollers or drums 59. On the drums 59 are arranged pluralities of brushes 60 of suitable material. The brushes 60 are arranged spirally on the drums 59, as illustrated in Fig. 3, so that they will assist in advancing the beet tops rearwardly when the drums are rotated to carry the beets upward in the machine, as will be made clear in the description of the operation of said machine, hereinafter set forth.

It will be noted that the arrangement of the gearing hereinbefore described, is such that the adjacent faces of the drums 59 rotate upwardly and that the adjacent stretches of the belts 45 on opposite sides of the machine move upwardly and rearwardly in the machine.

The rear ends of the shafts 55 are pivotally mounted at 61 on respective shafts 40. The forward ends of said shafts are mounted in bearings 62, which are laterally slidable in suitable guide devices 63. Pins or rods 64 are secured to the bearings 62 and slide through the frame members 14. On the pins 64 between the frame members 14 and bearings 62, are coil springs 65, whereby the bearings 62 are yieldingly held toward the inner limit of their sliding movement. It will be seen that the sliding construction of the bearings 62 makes it possible for the lower ends of the shafts 55 and for the lower portions of the rollers 59 to be swung laterally toward or from each other for handling beets of different sizes.

I will now describe the practical operation of the machine up to the point therein where the tops of the beets are cut off, and then will describe the construction of the topping or cutting mechanism and the operation thereof.

The machine is taken to the field, where the beets are to be harvested, and the front end is lowered by manipulation of the lever 28. The machine is then drawn forwardly by any suitable motive power. The plow devices will enter the ground on each side of the row of beets. The members 32 will loosen and raise the earth around the beets, and carry the beets upwardly with the loosened dirt without touching or injuring the beets. The beet tops will be caught by the lower belts 45, on the sprocket wheels 44, and by the brushes 60 on the lower ends 58 of the rollers 59, whereupon the belts and the rollers will carry the beets rearwardly and upwardly in the machine. In this connection it will be noted that the lower portions of the lower channels 48 form guide and limiting devices which limit the upward movement of the beets between the rollers 59.

As the beets 66 are carried rearwardly in the machine, their tops are gripped by the brushes 60 on the rollers 59 and drawn upwardly until the upper portions of the beets engage the lower parts of the lower channels 48, as shown in Fig. 5, and all the beets are held in this position by the brushes on the rollers 59, and are carried rearwardly by the belts 45 on the sprocket wheels 44. It will thus be seen that the bodies of the beets are drawn and held against the guides so that the beets are carried to the cutter in uniform positions and the proper amount of top is cut off each beet. The use of the brushes makes it possible to exert yielding grip on the beet tops, so that the tops are not torn off. The use of the brushes makes it possible to handle a plurality of beets of different sizes and tops of varying thicknesses without losing any of the beets having comparatively small tops. On account of the construction of the parts for mounting the lower ends of the belts 45 and the mounting of the lower ends of the shafts 55, it will readily be seen that in case of very large beets, the chains and rollers may be spaced apart somewhat to accommodate the different beets.

In this connection attention is called to the advantages of the flexible strips 47, and the resilient strips 49, which give the belts sufficient flexibility to accommodate beet tops of different sizes, and at the same time impose an inward tension on the belt, so that beet tops of small size will be properly gripped.

The beets are carried upwardly in the machine to the topping or cutting mechanism which will now be described.

Pivotally mounted on the frame, preferably just forward of the rear axle upon upright shafts or pins 67 are bell cranks 68 upon the forward ends of which are formed opposite cutting blades 69. Pivoted to the rear ends of the bell cranks are rearwardly extending links 70 which are pivoted at their rear ends to each other and to a rearwardly extending bar 71, on the rear end of which is formed an elliptical loop 72. Mounted on the shafts 67 are two forwardly extending curved tripping levers 73, which are inclined away from each other at their forward ends, and thence toward each other, as shown in Fig. 6. The tripping levers 73 are pivoted on the respective upright rods or shafts 67, and extend forwardly therefrom.

Mounted on a suitable supporting frame member 74 is a bearing block 75 in which is mounted a longitudinally arranged short shaft 76. Formed on the bearing block are rearwardly extending opposite bracket arms 77. Centrally pivoted to the rear ends of the bracket arms 77 are bell crank levers 78. Pivoted to the forward end of each bell crank lever is a link 79. The forward ends of the respective links 79 are pivoted to the rear ends of the tripping levers 73. The inner adjacent faces of the bell cranks 78 are pivoted on the shaft 76 at 80 and are arranged to slidingly overlap each other.

Pivoted to the forward end of the shaft 76 are two laterally extending catch devices 81 having adjacent forward extensions 82, and having at their outer ends hook members 83 adapted to coact with hook members 84 formed on the bell cranks 68, as illustrated in Fig. 6.

Secured to the frame members 85 are rearwardly extending coil springs 86, the rear ends of which are secured to the rear ends of the bell crank levers 68. The extensions 82 are yieldingly drawn toward each other by means of a spring 87 secured to said extensions.

A coil spring 88 is secured to the arms 89 and to the rear end of the arms 73. The parts of the cutting mechanism hereinbefore described are so arranged that the operation thereof is as follows:—

When a beet, carried by the belts 47 is brought rearwardly, it engages the tripping members 73 which release the cutting knives 69, and cut the beet top off, along the dotted line 90 as shown in Fig. 5, the operation being as follows:—

As the beet travels rearwardly in the machine, it forces the tripping levers 73 apart, thereby forcing the links 79 rearwardly and operating the bell crank lever 78, sliding the shaft 76 rearwardly, thereby withdrawing the catch members 81 from the hook members 84 on the bell crank levers 68. The frame members 85 are moved forward in the machine from the rear ends of the bell crank levers 68, and are so arranged that when the hook members 83 engage the hook members 84, the cutting blades 69 are held apart in substantially the position shown in Fig. 6. When the catch devices 81 are moved rearwardly the springs 86 bring the cutting blades 69 toward each other for cutting off the beet tops.

The arm 89 and spring 88 are so arranged that the springs 88 tend to yieldingly move the arms 73 toward their position with their central portions close to each other, as shown in Fig. 6.

Suitably mounted near the axle 10 is a beveled gear 91, in mesh with a beveled gear 92 on the axle 10. Formed on the beveled gear 91 is a pinion 93 in mesh with a pinion 94 suitably mounted on the frame of the machine. The pinion 94 is mounted on an upright shaft 95. On the shaft 95 is an arm 105 to which is pivoted a pawl 99. The pawl 99 is yieldingly held in engagement with the teeth of the internal ratchet gear 96 by means of a spring 100. Pivoted to the frame near the pinion 94 is an arm 102, on the front end of which is a hook member 103, adapted to engage the pawl 101, yieldingly drawing it toward the pawl 101, by means of a spring 104. The pawl 99 is pivoted to the arm 105 by means of a pin 106 shown in Figs. 6 and 8.

Secured to the rearwardly extending portion of one of the bell cranks 68 is a link 107. At the end of the link 107 is a loop 108 in which is received a pin 109 on the arm 102. The parts are so arranged that when the pawl 101 is in one position, it will be engaged and held downwardly by the hook 103 on the arm 102, thereby holding the pawl 99 out of engagement with the internal gear 96. When the cutting blades 69 are moved toward each other, the rod or link 107 moves forwardly in the machine causing the arm 102 to be moved forwardly thereby moving the hook 103 out of engagement with the pawl 101. and permitting the spring 100 to move the pawl 99 into engagement with the ratchet 96. The ratchet 96 and pinion 94 are being constantly rotated.

When the cutting blades 69 are moved toward each other the link or arm 71 is moved forwardly in the machine and as the gear 94 rotates, the pin 106 engages the rear portion of the loop 72, drawing the link 71 rearwardly and moving the cutting blades 69 outwardly to their open position, as shown in Fig. 6, until the hooks 83 clear the hooks 84, whereupon the springs 82 and 86 will hold the parts in position for holding the blades apart. On the completion of one revolution of the gear 94, the pawl 101 is engaged by the hook 103, and the parts are held in position until actuated by another beet.

It will be understood that some changes may be made in the construction and arrangement of the parts of my improved beet harvester without departing from its essential features and purposes, and it is my intention to cover by this application any such changes which may be included within the scope of my claims.

I claim as my invention:

1. In a beet harvesting machine, the combination of a frame mounted on wheels, a pair of parallel rollers mounted on said frame, means for imparting rotation to said rollers for moving their adjacent races upwardly, a plurality of brushes arranged spirally on each roller for carrying material upwardly and rearwardly in the machine, with a pair of endless carriers arranged adjacent to said rollers, means for imparting rotation to said carriers for moving their adjacent stretches upwardly and rearwardly in the machine.

2. In a beet harvesting machine, the combination of a frame mounted on wheels, a pair of parallel rollers mounted on said frame, means for imparting rotation to said rollers for moving their adjacent faces upwardly, a plurality of brushes arranged spirally on each roller for carrying material upwardly and rearwardly in the machine, with a pair of endless carriers arranged adjacent to said rollers, means for imparting rotation to said carriers for moving their adjacent stretches upwardly and rearwardly in the machine, guide devices for the adjacent stretches of said carriers, said guide devices being adapted to limit the upward movement of the bodies of vegetables, the tops of which are engaged by said carriers and the brushes of said rollers.

3. In a beet harvester the combination of a frame mounted on wheels, a pair of parallel rollers mounted for rotation on said frame, means for imparting rotation to said rollers for moving their adjacent faces upwardly, a pair of endless carriers adjacent to said rollers, means for imparting motion to said carriers for moving their adjacent faces upwardly and rearwardly in the machine, guides for the adjacent stretches of said rollers, said guides being adapted to limit the upward movement of the bodies of vegetables or the like, the tops of which are engaged by said carriers and said rollers.

4. In a beet harvester, a frame mounted on wheels, a pair of endless carriers, means for imparting motion to said endless carriers for moving their adjacent stretches upwardly and rearwardly in the machine, a pair of rollers adjacent to said endless carriers, means for imparting rotation to said rollers for moving their adjacent faces upwardly, and means for mounting the forward ends of said endless carriers for permitting them to move toward and from each other in the machine.

5. In a beet harvester, a frame mounted on wheels, a pair of endless carriers, means for imparting motion to said endless carriers for moving their adjacent stretches upwardly and rearwardly in the machine, a pair of rollers adjacent to said endless carriers, means for imparting rotation to said rollers for moving their adjacent faces upwardly, and means for mounting the forward ends of said rollers for permitting them to move toward and from each other in the machine.

6. In a beet harvester, a frame mounted on wheels, a pair of endless carriers, means for imparting motion to said endless carriers for moving their adjacent stretches upwardly and rearwardly in the machine, a pair of rollers adjacent to said endless carriers, means for imparting rotation to said rollers for moving their adjacent faces upwardly, means for mounting the forward ends of said endless carriers for permitting them to move toward and from each other in the machine, and means for mounting the forward ends of said rollers for permitting them to move toward and from each other in the machine.

7. In a beet harvester, a frame mounted on wheels, a pair of endless carriers, means for imparting motion to said endless carriers for moving their adjacent stretches upwardly and rearwardly in the machine, a pair of rollers adjacent to said endless carriers, means for imparting rotation to said rollers for moving their adjacent faces upwardly, means for mounting the forward ends of said endless carriers for permitting them to move toward and from each other in the machine, and means tending to yieldingly hold the forward ends of said endless carriers toward each other.

8. In a beet harvester, a frame mounted on wheels, a pair of endless carriers, means for imparting motion to said endless carriers for moving their adjacent stretches upwardly and rearwardly in the machine, a pair of rollers adjacent to said endless carriers, means for imparting rotation to said rollers for moving their adjacent faces upwardly, means for mounting the forward ends of said rollers for permitting them to move toward and from each other in the machine, and means tending to yieldingly hold the forward ends of said rollers toward each other.

9. In a beet harvester, a frame mounted on wheels, a digging device on said frame, means for engaging vegetables or the like and carrying them rearwardly and upwardly in said frame, a movable cutting member, means for actuating said cutting member, and guide devices arranged in the path of travel of said vegetables for actuating said last named means.

10. In a beet harvester, a frame mounted on wheels, a digging device on said frame, means for engaging vegetables or the like and carrying them rearwardly and upwardly in said frame, a movable cutting member, means for moving the same to cutting position, holding means for rendering said last means inoperative, engaging devices arranged in the path of travel of said vegetables, adapted when engaged by said vegetables to move said holding means to inoperative position.

11. In a beet harvester, a frame mounted on wheels, a digging device on said frame, means for engaging vegetables or the like and carrying them rearwardly and upwardly in said frame, a movable cutting member, means for moving the same to cutting position, holding means for rendering said last means inoperative, engaging devices arranged in the path of travel of said vegetables, adapted when engaged by said vegetables to move said holding means to inoperative position, and means for moving said cutting member away from cutting position.

12. In a beet harvester, a frame mounted on wheels, a digging device on said frame, means for engaging vegetables or the like and carrying them rearwardly and upwardly in said frame, a cutting mechanism, means for holding said cutting mechanism in inoperative position, and means for automatically releasing said last named means when one of said vegetables reaches a certain predetermined point in its travel.

Des Moines, Iowa, May 28, 1915.

FRED PRIOR.

Witnesses:
J. MAHER,
A. SHERMAN.